INVENTORS
Robert L. de Beauchamp
Thomas A. Sullivan

3,397,946
METHOD OF PRODUCING ANHYDROUS CHROMOUS CHLORINE FROM CHROMIUM METAL

Robert L. de Beauchamp and Thomas A. Sullivan, Boulder City, Nev., assignors to the United States of America as represented by the Secretary of the Interior
Filed June 8, 1966, Ser. No. 556,826
4 Claims. (Cl. 23—87)

This invention relates to a method for producing anhydrous chromous chloride, ($CrCl_2$).

Anhydrous chromous chloride is used as a constituent of fused salt electrolytes to supply the current-carrying soluble chromium ions in fused salt systems for the electrowinning or electrorefining of chromium metal. It is also used in similar electrolytes for the electrolytic upgrading of off-grade ferrochromium to produce a premium grade product. Chromous chloride also has use as a catalyst in organic reactions such as ethylene polymerization and fluorination of haloalkanes.

At present the methods employed to produce chromous chloride are too costly and result in the production of large amounts of other chromium chlorides such as chromic chloride ($CrCl_3$) with comparatively small yields of chromous chloride.

In the present invention chromium metal is reacted with chlorine gas at a temperature above the melting point and below the boiling point of chromous chloride. Molten $CrCl_2$ formed during the reaction is allowed to pass from the reaction zone, before being converted by excess chlorine to other chromium chlorides such as chromic chloride ($CrCl_3$). As the chromous chloride leaves the zone, chromium metal moves into its place in the zone by gravity.

The principal object of the invention is to provide an improved method for preparing chromous chloride by the reaction of chromium with chlorine.

A further object of the invention is to provide a method for reacting chromium with chlorine so that the chromous chloride produced does not further react with chlorine to produce chromic chloride.

Another object of the invention is to provide a method of reacting chromium with chlorine at an elevated temperature, above the melting point of chromous chloride but below its boiling point, so that the chromous chloride may be withdrawn from the reaction zone as it forms.

Another object of the invention is to provide a method for producing chromous chloride by reacting chromium with chlorine at an elevated temperature so that the chromous chloride drips downwardly from the reaction zone as it is formed.

Other objects and advantages of this invention will be apparent from the detailed description of the invention.

The manner in which the present invention provides a process for efficiently producing anhydrous chromous chloride will be had by reference to the drawings in which.

Figure 1:
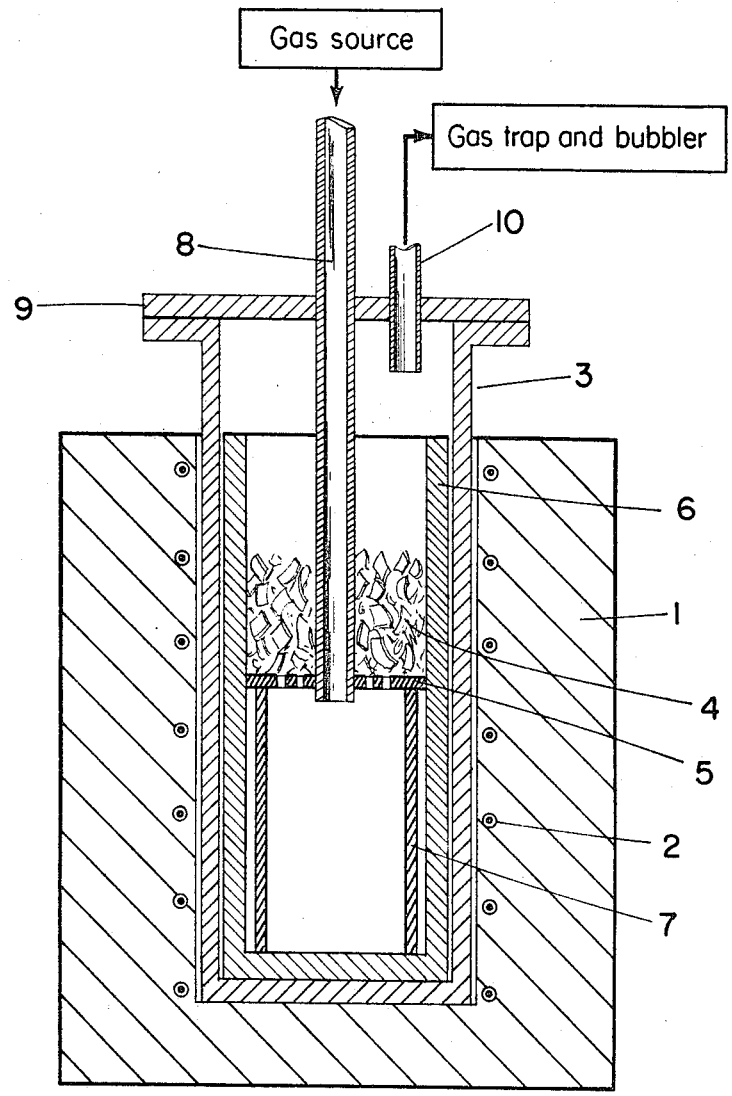
FIG. 1 shows a cross sectional view of an apparatus for carrying out the process.

Referring to FIG. 1, numeral 1 designates a furnace such as an electric resistance furnace with heating coils 2. A stainless steel pot 3 placed between coils 2 contains lumps of solid chromium metal 4. A perforated graphite disc 5 within a graphite crucible 6 in pot 3 supports the chromium. Disc support legs 7 enable the chromium metal charge to be held above the bottom of the crucible 6. A graphite gas delivery tube 8 projects through the pot cover plate 9, then through the charge and the disc 5 to deliver chlorine gas into the space between the disc and crucible bottom so that the chlorine may pass upwardly through the charge. Exhaust gases pass out of the pot from the space above the charge by way of exit conduit 10 to a gas trap and scrubber such as a mercury bubbler trap and scrubber bottle containing a strong caustic soda solution.

In operation, pieces of chromium metal 4 are placed on top of disc 5 in crucible 6. Cover plate 9 is then sealed to the top of the pot, and the pot placed in the electric resistance furnace 1. Helium gas is injected through delivery tube 8 to purge the pot. Current is then passed through the heating coils 2 of the furnace 1 to raise the temperature within the pot to above the melting point of chromous chloride, preferably about 900° C., while a small stream of heilum is continuously passed through the pot. When the operating temperature is reached, the flow of helium is discontinued and chlorine gas is introduced through tube 8 for an extended period of time. As the reaction progresses, the chlorine addition rate is decreased. For example, during the treatment of 11 pounds of chromium metal, 0.07 cubic feet of chlorine per minute are introduced until approximately 80 percent of the theoretical requirement is added. This takes about 3 hours. The chlorine flow rate is then reduced to 0.03 cubic feet per minute for the remainder of the chlorination, a period of about one hour. A maximum pot temperature below the boiling point of chromous chloride, preferably about 1000° C., is maintained by reducing the current through coils 2. Completion of the chlorination is indicated by the emergence of unreacted chlorine gas from the mercury bubbler trap and caustic scrubber causing these devices to heat up.

As soon as molten chromous chloride forms during the reaction, it runs downward through perforated disc 5 out of the reaction zone, and is collected in the bottom of graphite crucible 6 where it solidifies. Simultaneously, unreacted solid chromium metal (M.P. 1875° C.) in the upper portion of the charge passes by gravity to the lower portion of the charge in the vicinity of the disc 5 where it reacts with incoming chlorine. By passing out of the reaction zone shortly after it forms, the chromous chloride is prevented from coming in contact with excess chlorine and thereby being oxidized to, for example, the trichloride.

At the end of the reaction, after allowing it to cool to room temperature, the pot is disassembled and the graphite crucible broken open to obtain the solid chromous chloride in the collection zone.

Figure 2:
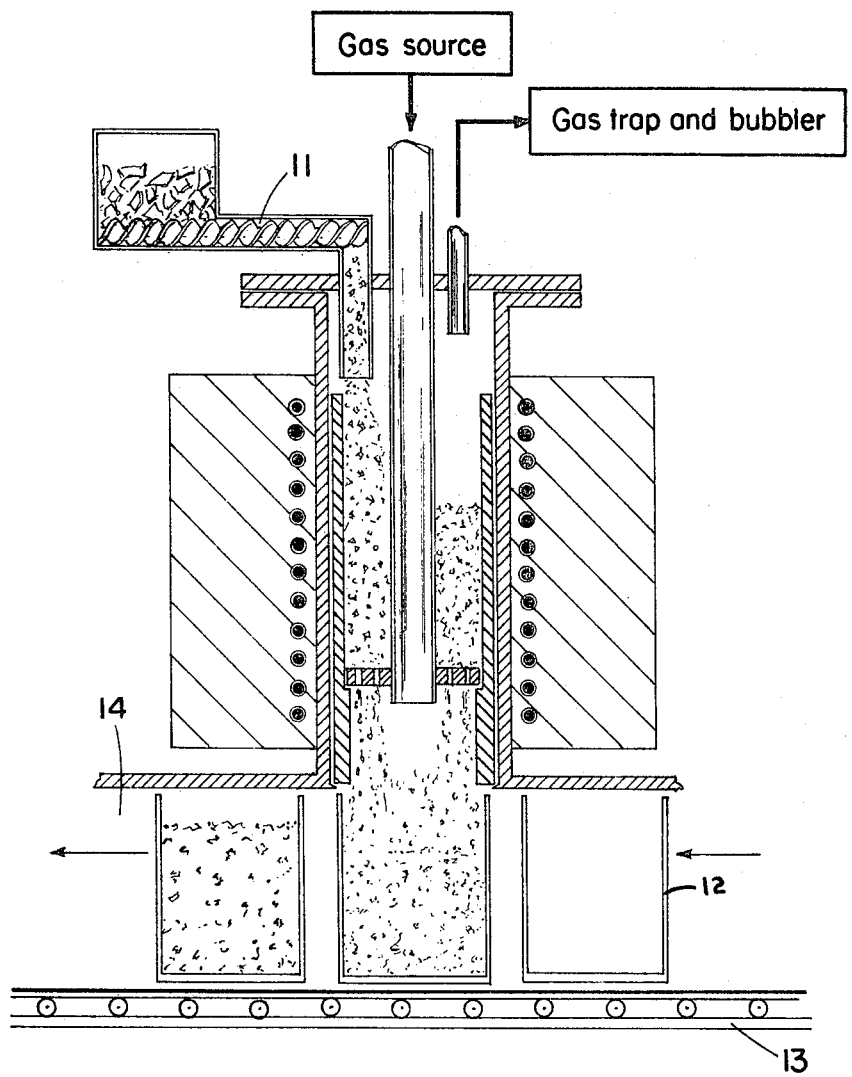
FIG. 2 shows a modification of FIG. 1 in cross section.

A continuous operation can be attained (as shown in FIG. 2) by placing a chormium metal screw feeder 11 at the top of the pot and chromous chloride receivers 12 below and exterior to the furnace on a conveyor belt 13 in an air-tight chamber 14 so that product can be periodically or continuously removed.

Figure 3:
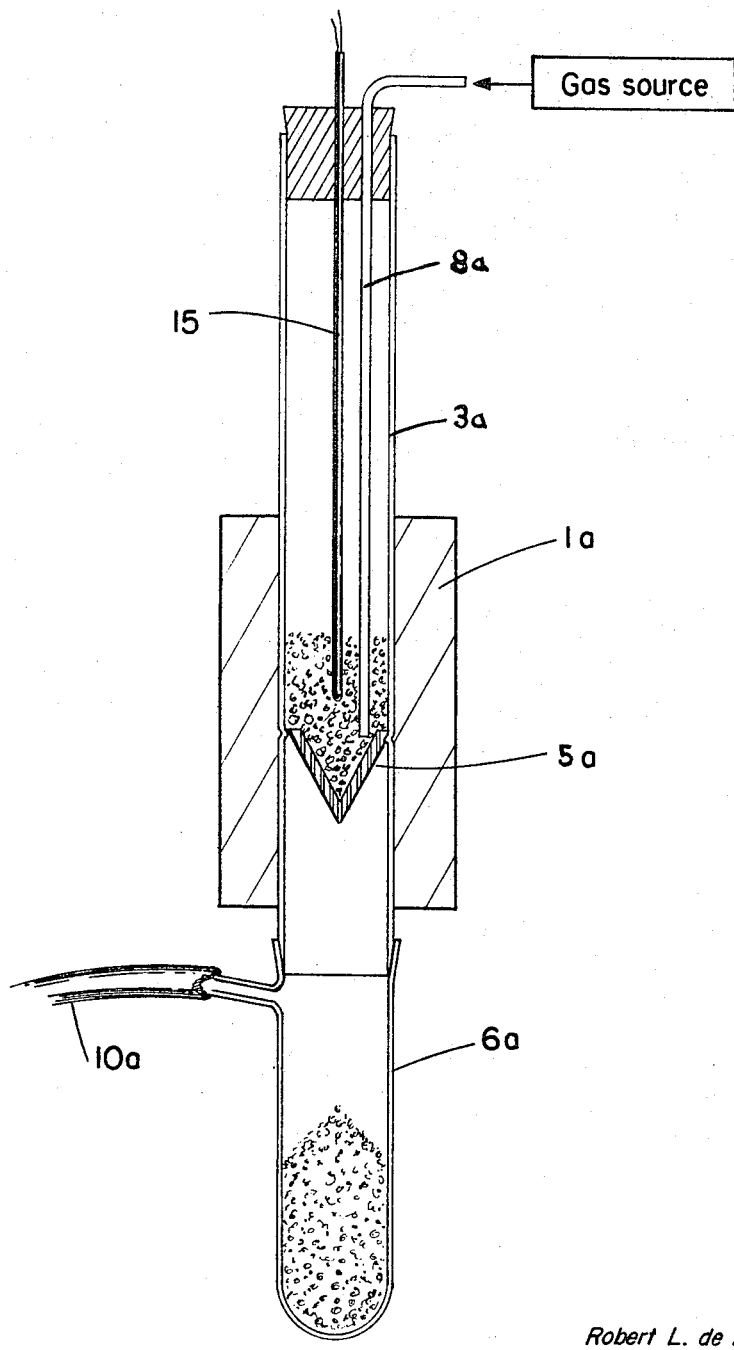
FIG. 3 shows an alternative embodiment in cross section.

Other devices can be employed in the reaction zone. For example, as shown in FIG. 3, the chunks of chromium metal can be placed into an inverted, cone-shaped, perforated, high silica glass support 5a within a high silica glass tube 3a held inside furnace 1a, chlorine gas being added through conduit 8a, heat being supplied by thermocouple 15, and the molten chromous chloride passing to the bottom of pot 6a. Gases exit from the apparatus through conduit 10a.

Although graphite and high silica glass are suitable, other inert and noncorrosive materials of construction will be apparent to those skilled in the art. The use of a high silica glass delivery tube for the chlorine gas has been found to be particularly durable under the high temperature operation.

High yields of chromous chloride, without the production of other undesirable chlorides, are achieved through the process of the present invention. As much as 93 percent of the chromium metal can be converted to chromous chloride in batch operation.

Although the particular process described is well adapted to carry out the objects of the present invention, it is to be understood that various modifications may be made all coming within the scope of the following claims.

What is claimed is:

1. A method of producing chromous chloride comprising
   (a) contacting solid chromium metal with chloride gas in a reaction zone maintained at a temperature above the melting point and below the boiling point of chromous chloride, whereby molten chromous chloride forms in said reaction zone;
   (b) passing said molten chromous chloride, as it forms, to a collection zone so that said molten chromous chloride is not contacted with excess chlorine gas in said reaction zone.

2. The process of claim 1 wherein said molten chromous chloride passes from said reaction zone to said collection zone by gravity.

3. The process of claim 2 wherein said chlorine gas is fed to the lower portion of said reaction zone and wherein said molten chromous chloride passes out of said lower portion of said reaction zone, and further wherein unreacted solid chromium metal in the upper portion of said reaction zone gravitates to said lower portion as said molten chromous chloride passes out of said reaction zone.

4. The process of claim 3 wherein said reaction zone temperature is within the range of about 900° C. to about 1000° C.

References Cited
UNITED STATES PATENTS

| | | | |
|---|---|---|---|
| 1,738,780 | 12/1929 | Low | 23—87 XR |
| 2,349,747 | 5/1944 | Muskat | 75—112 |
| 2,837,420 | 6/1958 | Doerner | 75—84.5 |
| 2,946,668 | 6/1960 | Richelsen | 23—87 XR |
| 3,147,073 | 9/1964 | Brown | 23—87 |
| 3,297,463 | 1/1967 | Hartouni | 23—87 XR |

OSCAR R. VERTIZ, *Primary Examiner.*

EDWARD STERN, *Assistant Examiner.*